(12) United States Patent
Craig et al.

(10) Patent No.: US 6,862,927 B2
(45) Date of Patent: Mar. 8, 2005

(54) FILTERS FOR ENGINE EXHAUST PARTICULATES

(75) Inventors: Angus G. Craig, Corning, NY (US); Robert J. Locker, Corning, NY (US); Constance B. Sawyer, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/439,562

(22) Filed: May 16, 2003

(65) Prior Publication Data

US 2004/0226352 A1 Nov. 18, 2004

(51) Int. Cl.⁷ .............................................. G01M 15/00
(52) U.S. Cl. ...................................................... 73/118.1
(58) Field of Search ............................ 73/118.1, 23.31, 73/23.32; 701/101, 102, 103, 108, 109

(56) References Cited

U.S. PATENT DOCUMENTS

| | | | | |
|---|---|---|---|---|
| 5,279,146 A | * | 1/1994 | Asano et al. | 73/28.04 |
| 6,089,017 A | * | 7/2000 | Ogawa et al. | 701/103 |
| 6,481,299 B2 | * | 11/2002 | Silvis et al. | 73/863.81 |
| 6,796,165 B2 | * | 9/2004 | Abdul-Khalek | 73/28.01 |
| 2002/0134174 A1 | * | 9/2002 | Silvis et al. | 73/863.81 |
| 2002/0189097 A1 | * | 12/2002 | Collins et al. | 29/890 |
| 2004/0139785 A1 | * | 7/2004 | Abdul-Khalek | 73/28.01 |

FOREIGN PATENT DOCUMENTS

WO 02/066802 8/2002

OTHER PUBLICATIONS

T. Brewbaker et al.. "Control of Oxygen for Thermal Management of Diesel Particulate Filters". SAE Technical Paper Series 2002-01-0427. SAE 2002 World Congress. Detroit. MI (Mar. 2002).

* cited by examiner

Primary Examiner—Eric S. McCall
(74) Attorney, Agent, or Firm—Kees van der Sterre

(57) ABSTRACT

The regeneration responses of diesel engine exhaust filters are mapped by conducting multiple regeneration runs under controlled conditions of soot loading, exhaust temperature, exhaust flow rate, exhaust oxygen content and/or other regeneration condition variables to generate a multivariate response surface or filter map that can be used to predict regeneration response under other conditions and aid in the design and active management of the filters to improve filter efficiency and extend filter service life.

9 Claims, 2 Drawing Sheets

FILTERS FOR ENGINE EXHAUST PARTICULATES

BACKGROUND OF THE INVENTION

The present invention relates to particulate filters for the removal of particulates from combustion engine exhaust gases, and methods for using such filters, that provide substantial improvements in filter durability and efficiency.

Wall flow diesel particulate filter technology has been used with some success for approximately 15 years. The filters provide excellent filtration of particulate matter, but have experienced problems during the regeneration phase of their operation. The regeneration phase is required to burn the complement of accumulated soot out of the filter. This process is typically accomplished by when the internal temperature of an uncatalyzed filter reaches approximately 600° C. When the carbon soot particles reach this temperature in the presence of adequate oxygen the combustion process can proceed.

The rate and severity of the exothermic temperatures reached during the filter regeneration reaction can be a problem. The problem arises in part because the amounts and types of soot accumulated prior to initiating soot regeneration cannot be accurately predicted. At present, engine manufacturers utilize various criteria to indicate the need for a regeneration cycle, one approach being to simply correlate soot accumulation with a one-dimensional variable such as filter pressure drop observed on an engine test stand. This approach does not take into account the fact that the variety of engine operating conditions that can exist make both the nature of the soot accumulation and the combustion behavior of that accumulated soot highly variable.

In cases where excessive concentrations of carbon soot particles are accumulated in the filter the maximum exotherm temperatures can be high enough to melt cordierite. i.e., reaching reaction temperatures of 1450° C. or more. This melting leads to failure of the filter due to particulate leakage. In addition, the extreme nature of some regenerations may induce filter cracking due to the large thermal gradient within the part, also resulting in particulate leakage. And finally, it may be desirable to limit the maximum filter regeneration temperature, e.g., to temperatures of 1000° C. or lower, for purposes such as protecting the catalyst against deactivation. For all of these reasons it is critical to control the regeneration reaction to achieve maximum filter durability.

Without knowing the conditions that will damage the filters, engine and engine control designers cannot keep the engine output from creating uncontrolled exothermic reactions during regeneration. This inability to understand and control the regeneration process to better manage filter performance prevents less costly filter materials from be used to meet the filtration needs of the automotive industry. Instead expensive materials solutions have to be considered that lead to undesirable tradeoffs in fuel efficiency and emissions The current technique being adopted for mitigating these extreme regenerations is to choose a filter material that will not yield extreme regenerations in the presence of high soot concentrations. The reason is that it may not always be possible to limit the amount of accumulated soot. For this reason SiC filters have been tapped for early introduction in the marketplace.

SiC filters can demonstrate improved thermal capacity under conditions of high soot accumulation for two primarily reasons. The first reason is that SiC wall flow filters produced at an equivalent wall thickness and cell density to cordierite will respond with lower exotherm reactions for an equal complement of accumulated soot. Silicon carbide has a phase density that is greater than that of cordierite and therefore possesses greater capacity to absorb heat without experiencing a temperature rise as compared to an equivalent cordierite filter. Another reason for the lower exothermic response is that under identical inlet gas temperatures the SiC filter will start its exothermic reaction at a lower temperature than that for cordierite. The higher thermal conductivity of SiC compared to cordierite permits it to loose heat to the surrounding environment more efficiently and therefore operates at a lower equilibrium filter temperature for a given set of inlet temperatures.

Another concern, applicable to all prospective exhaust filters, is that the regeneration process once initiated be supported sufficiently to proceed to completion during each cycle, in order to reduce need for more frequent regeneration cycling. Current regenerating schemes can permit incomplete regeneration due to insufficient combustion temperatures, since the engine output conditions required to initiate full regeneration can differ based on both soot combustion and filter performance characteristics.

The underlying problem is that present filter regeneration cycles are initiated with limited information about actual filter response, precluding overall design optimization for reduced regeneration cycle frequency and overall reduced system cost. Much effort has been directed at adapting filter composition and geometry as above described, but little work has been done to understand and control filter response over the wide variations of exhaust input conditions these filters may experience.

The recent paper, "Control of Oxygen for Thermal Management of Diesel Particulate Filters", T. Brewbaker et al., SAE Technical Paper Series 2002-01-0427, SAE 2002 World Congress, Detroit, Mich. (March 2002), suggests a method for avoiding excessive filter regeneration temperatures by limiting the oxygen supplied to the filter during regeneration. This is accomplished by adapting the engine exhaust gas recirculation (EGR) system, a system primarily designed to limit engine combustion temperatures, so that additional exhaust gas is recirculated into the combustion mixture during the filter regeneration cycle. While this adaptation has some effect on limiting filter regeneration temperatures, it does not take into account the actual response of the filter to other changes in exhaust gas characteristics. Thus factors such as reduced exhaust temperature or increased exhaust soot content that can significantly affect the severity and/or efficiency of the regeneration cycle are not considered.

SUMMARY OF THE INVENTION

The present invention provides a method for assessing the regeneration response of engine exhaust particulate filters to a variety of regeneration conditions to which such filters are subjected in use. In particular, methods are provided for assessing the regeneration response of these filters at various soot loadings under various sets of exhaust inlet conditions. Through the practice of the invention, a substantially enhanced understanding of the operating characteristics of combustion engine exhaust filtration systems has been developed that permits much more effective use of these systems. This understanding is of value not only for developing strategies to limit the extent of filter regeneration exotherms developed during carbon burnout, but also to insure more complete burnout with each regeneration, thereby extending effective filter service life.

The assessments of filter response carried out in accordance with the invention employ novel experimental test methods that can evaluate filter performance under a wide variety of use conditions. These methods comprise both laboratory test bench procedures and controlled engine exhaust filtration tests that permit complete independent control of variables as well as response verifications under actual use conditions. Data sets covering a broad range of filter operating conditions for each filter design to be assessed can be generated.

Statistical analyses of the resulting data are used to develop empirical numerical models of filter regeneration response for each different filter design, those models providing a reliable basis for predicting filter performance under any given set of exhaust gas inlet parameters. Accordingly users of the models can easily input a particular set of exhaust inlet conditions and obtain calculated filter response outputs such as the maximum exotherm temperature to be expected, the thermal gradients to be developed within the filter, the filter regeneration efficiency expected under a particular set of inlet conditions of interest, and others.

Through analysis of these outputs, filter designs better suited to the operating characteristics of particular engine designs may be selected. Engine operating conditions leading to filter-damaging regeneration temperatures may be avoided, as may engine operating regions wherein the availability of heat and/or oxygen are insufficient to support initiation or completion of a regeneration cycle. Thus the possibility of developing "intelligent" active strategies for managing filter operation, rather than simply using such filters in a passive operating mode as is currently the case with automobile emissions control catalysts, can be considered.

Accordingly, in a first aspect, the invention includes a method for determining the regeneration performance of an engine exhaust gas particulate filter under multiple sets of regeneration conditions. That method comprises, first, loading a particulate filter of a selected design with a measured quantity [S] of a combustible particulate material. Typically that material will comprise engine-generated exhaust gas soot or a synthetic carbon powder approximating the behavior of such soot, that will undergo combustion under conditions similar to those effective to initiate combustion of diesel engine exhaust soot.

After the filter has been pre-loaded with the particulate, an exhaust gas stream consisting, for example, of diesel engine exhaust gas or a synthetic exhaust gas mixture is conveyed through the filter. The gas stream employed will be one that has been characterized as to its properties, i.e., properties relating to its gas flow rate, gas temperature, and gas composition, prior to introduction into the filter. Preferably exhaust inlet parameters or variables such as inlet oxygen content $O_2$, exhaust gas inlet temperature $T_i$, inlet flow rate $V_i$, and/or inlet hydrocarbon content $HC_i$ that are subject to external control will have been quantified, and at least two of these variables will have been fixed at known values.

Once a flow of the selected gas has been established, combustion of the particulate material present in the filter is initiated to develop filter regeneration conditions equivalent to those of a typical filter regeneration cycle. Initiation can be accomplished by various means, including the use of peripheral heaters to raise the temperature of the filter, an ignition system disposed within the filter itself, the introduction into the filter of a flame or other heated gas, or by selecting an elevated value for the exhaust inlet temperature parameter $T_i$. With any of these approaches, the at least two exhaust inlet variables set at known values prior to the initiation of combustion will be maintained at those values throughout the combustion process.

During this combustion and/or at the conclusion of the controlled regeneration cycle, conditions within the filter will be monitored and evaluated to record one or more key filter performance variables associated with the regeneration process. Such monitoring will preferably include at least one of a peak combustion temperature observed within a preselected segment of the filter during the combustion process, and/or the amount of any residual combustible particulate material remaining within the filter at the conclusion of the regeneration cycle. Other performance variables, including for example the magnitude of temperature gradients observed across selected diametrical or longitudinal dimensions of the filter, may also be monitored.

After collecting the data from a first or preceding filter regeneration process, the steps of filter loading, exhaust gas flow initiation, soot combustion and monitoring will be repeated at least once during a second or succeeding regeneration cycle. More typically, additional data on filter performance will be gathered over multiple additional cycles. For each test run, the filter will be fully regenerated to its initial condition prior to testing. However, for the second or each succeeding filter regeneration cycle, different settings for at least one and preferably both of the two exhaust inlet variables that were set at known values during the first regeneration cycle will generally be used. Also, the quantity of combustible particulate present in the filter at the start of the cycle may be set at different values.

Apparatus for effectively analyzing the regeneration response of an engine exhaust gas particulate filter in accordance with the above method comprises another aspect of the invention. Broadly characterized, apparatus suitable for that purpose includes, first, a gas stream generator for generating a gas stream of controlled exhaust parameters or variables. The gas stream generator can be an engine or a source of synthetic exhaust gas, but it must be one through which at least two of the gas variables selected from the group of inlet oxygen content $O_2$, inlet temperature $T_i$, inlet flow rate $V_i$, and/or inlet hydrocarbon content $HC_i$ are subject to control at known values. A synthetic source, e.g., a synthesized air-nitrogen mixture, is best suited for multi-variant filter characterization since the composition and flow rate of the exhaust stream can thereby be closely and independently controlled.

The testing apparatus will additionally comprise conduit or other means for connecting the output of the selected exhaust stream generator to an exhaust gas particulate filter to be tested, and it will comprise multiple sensors for sensing two or more of the exhaust gas variables selected for monitoring. If desired additional sensors for monitoring the amount of combustible particulate present at the start and termination of each regeneration cycle in real time may be provided.

Finally, the apparatus will include means for heating the filter or the exhaust stream to a temperature at least sufficient to initiate the combustion of combustible particulate present in the filter at the start of a regeneration cycle. Direct filter heating means provide better flexibility regarding the use of low exhaust inlet temperatures, but preheating of the exhaust gas stream is more easily implemented and more likely to be designed into actual engine emissions control systems.

In yet another aspect of the invention, a method for modeling the regeneration performance of a filter design of predetermined honeycomb geometry and composition type is provided. In general, that method comprises first loading a sample filter of the predetermined honeycomb geometry and composition type with a measured quantity of combustible particulate material, and then initiating filter regeneration via combustion of the particulate under controlled exhaust gas conditions to evaluate filter regeneration response.

More particularly, combustion of a known quantity [S] of combustible particulate is initiated while conveying through the filter an exhaust gas stream characterized by two or more exhaust gas inlet variables selected from the group consisting of inlet oxygen content $O_2$, inlet temperature $T_i$, inlet flow rate $V_i$, and inlet hydrocarbon content $HC_i$. At least two of these exhaust inlet variables will be known, and will be maintained at constant values while combustion of the particulate within the filter proceeds to completion.

During and following the combustion interval under these known regeneration conditions of S and the selected inlet variables, at least one and preferably several filter response variables [R] will be tracked and recorded. Filter response variables [R] that may be tracked will most often include one or more variables selected from (i) a peak combustion temperature observed within a pre-selected segment of the filter and (ii) filter regeneration efficiency, or the proportion of the initial combustible particulate loading [S] remaining in the filter at the end of the interval. Other response variables that may be selected for evaluation include temperature gradients developed during regeneration between two or more pre-selected segments of the filter, filter regeneration rates as determined by pressure drop changes occurring across the filter in the course of the regeneration process, and various other response variables impacting filter regeneration efficiency and performance. The measured response variable(s) will then be correlated with the particular initial quantity of combustible particulate and the particular values of the exhaust variables obtaining during each particular regeneration cycle.

After the above measurement process has been completed as described, the entire process is repeated at least once, and preferably multiple times, to generate a data set correlating the selected response variable or variables R with different sets of regeneration conditions. More particularly the process will be repeated with different values of the at least two exhaust inlet variables and the amount of combustible particulate S present in the filter. The inlet variables to be controlled will typically be the same variables selected during the initial test, although a different set of two or more such variables may be chosen where responses to changes in such other variables is to be mapped.

Finally, the data generated from multiple combustion (regeneration) runs conducted as above described is processed to generate a multidimensional response surface correlating values at least one filter response variable (e.g., the peak filter regeneration temperature or the filter regeneration efficiency) with the different values of at least two of the exhaust inlet variables and combustible particulate loadings within the ranges covered by the runs. Inasmuch as the selected filter response variable will depend on at least two filter inlet variables, the multidimensional response surface will be a 3-dimensional or higher multidimensional response surface.

The multivariate response model represented by that response surface permits the value of the selected filter response variable to be predicted for any given set of exhaust inlet and particulate loading variables within the ranges of those variables covered by the generated data sets and their interpolations. Further, the predicted value(s) will be valid for, and characteristic of, all filters of the same or substantially the same predetermined honeycomb geometry and composition type.

A characteristic multivariate numerical response model thus provided may assume one of several useful forms depending upon the number and type of test results collected. In general, the response model will be of the form $R=f(V1, V2, \ldots, Vn)$, wherein R is a filter response value selected from the group of: peak filter regeneration temperature and filter regeneration efficiency and f is an empirical function, experimentally derived as above described, that correlates values of R with values of a set of terms (V1, V2, ... Vn). Included in the set of terms (V1, V2, ... Vn) will be variable terms dependent at least two regeneration condition variables selected from the group of: inlet stream oxygen content $O_2$, inlet stream temperature $T_i$, inlet stream flow rate $V_i$, inlet stream hydrocarbon content $HC_i$, and initial combustible particulate loading S. Examples of other regeneration condition variables that may be included in the response model are exhaust gas nitrogen oxide content NOx and exhaust gas water content.

In one convenient form the function f is a polynomial function of 6–10 terms including first order, second order and/or interactive terms incorporating the described regeneration condition variables. Regardless of form, the filter response model or filter map will be characteristic of the particular filter design, or family of closely related designs, being modeled, with different models being derived as above described for any particular filter composition and design to be evaluated.

The significant technical and economic value of a multivariate response model generated as above described is that it can be provided along with filters of the same geometry and composition type to customers incorporating filters of that type into engine emissions control systems. The information contained in such models helps emissions control system designers better understand and design for the various factors affecting filter efficiency, filter regeneration performance, and filter service life. For example, a preferred numerical model includes indicators of certain limits on the values of the regeneration condition variables. Observation of those limits would insure that a correlating filter response value R would be limited to only such values as would be compatible with the particular material composition and geometry of the particulate filter product characterized by the model. Regeneration condition values that might result in excess filter temperatures or incomplete filter regeneration could accordingly be avoided.

A further aspect of the invention therefore resides in a method for aiding a customer in the design of a diesel engine exhaust emissions control system incorporating a diesel particulate filter of a particular design. That method comprises the initial steps of, first, selecting a diesel particulate filter of predetermined geometry and composition type, and then generating a numerical model or map of filter regeneration response characteristics for the diesel particulate filter by the methods above described. In preferred embodiments, the filter map will correlate at least one filter response variable selected from the group of: peak filter regeneration temperature and filter regeneration efficiency with ranged values for a set of filter regeneration condition variables. That set will include at least two regeneration condition variables selected from the group consisting of: inlet oxygen content $O_2$, inlet temperature $T_i$, inlet flow rate $V_i$, inlet hydrocarbon content $HC_i$, and initial combustible particulate loading S.

The model thus generated is then stored in a form that can be processed by a general or special purpose digital computer. Digital storage may be transient, as in temporary computer memory, or permanent as recorded on a digital storage medium such as a tape or disk. Finally, the stored model is communicated to a customer for the particular diesel filter design characterized by the model. This digital form of the model is generally the most practical form for quickly projecting filter response characteristics under various regeneration conditions, and for supporting the various types of exhaust emissions control system design activity currently employed in the industry.

An important advantage of the use of filter performance models such as hereinabove described is that they can enable the use of filter designs and compositions optimized for the control of exhaust emissions, rather than designed simply to withstand severe regeneration conditions or maximize regeneration efficiency. For example, the use of costly filter materials such as silicon carbide that are prescribed primarily to withstand the temperatures of uncontrolled, unmanaged filter regeneration can generally be avoided. Thus the range of suitable filter materials and geometries is significantly expanded, and the prospective costs of optimal emissions control systems are substantially reduced.

DESCRIPTION OF THE DRAWINGS

The invention is hereinafter further described with reference to the drawings, wherein.

DETAILED DESCRIPTION

Laboratory bench testing is a preferred method for initially evaluating particulate filter response characteristics because of the degree to which all of the variables affecting filter response can be independently set and controlled. An important first step in the process of bench testing is that of loading a filter to be characterized with known quantities of a combustible particulate or "artificial soot" that is consistent as to composition, particle size, and combustion characteristics. The combustion characteristics of this so-called "artificial soot" should be similar to those of diesel engine exhaust particulates, and the distribution of the combustible within the filter should mimic soot distributions produced by diesel engines. Convenient and economic artificial soots for these purposes include commercially available carbon blacks of the kind employed as pigments or fillers. Printex®-U carbon black from Degussa AG, Frankfurt, Germany is an example.

Figure 1:
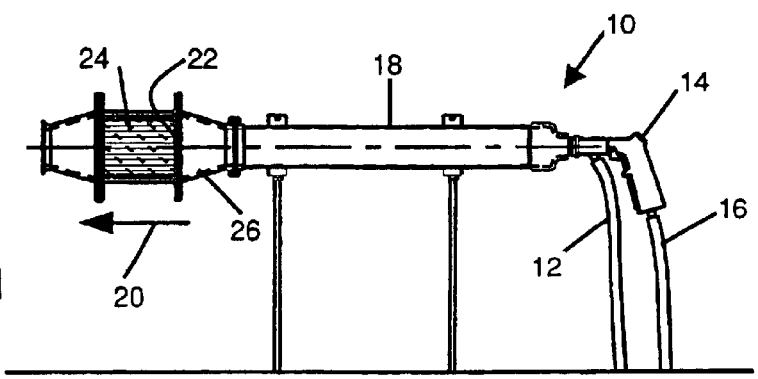
FIG. 1 illustrates laboratory apparatus for loading a filter with combustible particulate.

A schematic elevational view of a suitable system 10 for loading a satisfactory distribution of such an artificial soot within a particulate filter selected for testing is presented in FIG. 1 of the drawing. In the operation of system 10, a quantity of dry soot, conveyed by a screw feeder from a humidity controlled cabinet (not shown), is funneled into hose 12 for delivery to an air gun such as sandblasting gun 14. A compressed air line 16 aspirates the soot down a metal tube 18 in the direction of flow arrow 20 into the inlet face 22 of a filter 24 supported in filter enclosure or can 26. A suitable flow rate for the air feed through the gun is 20 ft$^3$/min. The canned filter assembly is weighed both prior to and after soot loading to establish the soot loading, in grams per liter of filter volume, resulting from the process.

Figure 2:
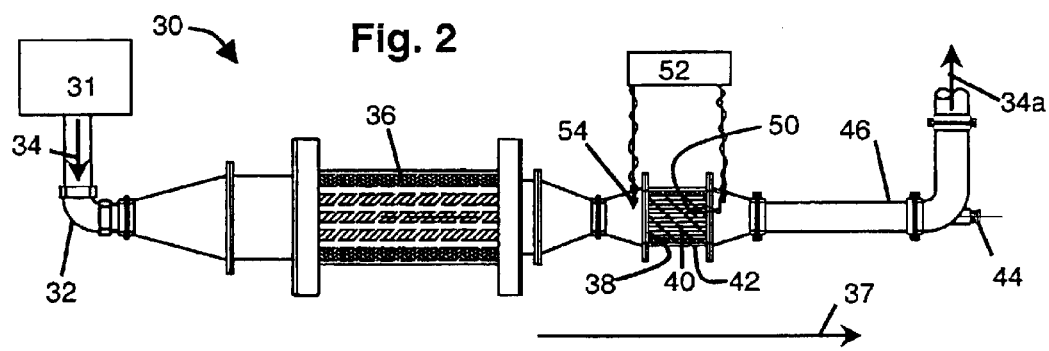
FIG. 2 illustrates laboratory apparatus for mapping filter response variables.

The response characteristics of a filter thus loaded with a controlled quantity of soot may be evaluated utilizing a filter bench testing system such as schematically illustrated in FIG. 2 of the drawings. As shown in FIG. 2, testing system 30 includes a gas mass flow control unit 31 connected to an inlet conduit 32 for the generation of an inlet stream 34 of a synthetic exhaust gas for the system. The synthetic exhaust stream typically consists of nitrogen, air-nitrogen, or air-nitrogen-hydrocarbon mixture of known oxygen and hydrocarbon content as established by mass flow control unit 31.

The exhaust stream thus provided is conveyed through a heater 36 that raises the gas temperature of the stream to a set value, and is then conveyed through cone connectors in the direction of flow arrow 37 to the inlet face 38 of a soot-loaded filter 40 resiliently supported within a filter enclosure 42. After passing through filter 40, the exhaust stream is conveyed via conduit 46 past gas sampling port 48 to be discharged from the apparatus as filtered exhaust stream 34a.

For real-time temperature measurements of the filter during a regeneration cycle, one or more thermocouples such as thermocouple 50 are positioned within filter 40 with electrical leads from the thermocouple being fed through an insulated port in enclosure 42 for connection to a temperature recorder 52. Likewise, one or more thermocouples such as thermocouple 54 may be positioned upstream of inlet face 38, with leads fed through a similar port for similar connection to recorder 52, to measure the temperature of the inlet exhaust stream entering the filter.

In operation, bench testing system 30 permits full control of the initial conditions present as a regeneration cycle is initiated within filter 40. The two or more of the variables inlet stream oxygen content $O_2$, inlet stream temperature $T_i$, inlet stream flow rate $V_i$ and inlet stream hydrocarbon content HC, are first set at known values using mass flow control unit 31. Any desired flow rate may be set, but values in the range of about 700–4000 liters/min that are typical of engine exhaust stream flow rates are generally selected.

Once the inlet conditions have been established, the combustion of the known quantity of particulate present within filter 40 is initiated. Combustion is allowed to continue and run to completion while maintaining the selected inlet stream variables constant. During or subsequent to this process one or both of the peak combustion temperature observed at thermocouple 50 or the amount of residual particulate in the filter as measured by weighing the regenerated filter are determined. This test cycle is then repeated as often as needed to build a statistically significant data set correlating peak combustion temperature and/or residual particulate content (regeneration efficiency) with a desired range of exhaust stream inlet values and soot loading values expected to be encountered in the course of filter operation with an engine.

An illustrative example of the generation of such a data set utilizing a testing system such as shown FIG. 2 is as follows.

EXAMPLE 1

Filter Bench Testing

A porous ceramic wall flow filter of cordierite chemical composition is selected for evaluation. The filter to be evaluated is a cylindrical honeycomb filter of 4.5 inches diameter and 5 inches length, comprising alternately plugged channels at a cell density of 200 cell/in$^2$ of filter frontal area and a channel wall thickness of 0.012 inches, with a wall porosity of 50% volume. This filter configuration is adequate to handle exhaust gas flows such as would be produced by two-liter diesel engines.

For each test run, the selected filter is first preloaded with a measured quantity of an artificial soot, in this case consisting of Printex®-U carbon black from Degussa AG, Frankfurt, Germany. Soot loadings in the range of about 9–22 grams/liter of filter volume are used. The filter is then fitted with a thermocouple for measuring regeneration temperatures, the thermocouple being positioned 4 inches from the filter front face and 10 mm from the outer cylindrical surface of the filter.

The soot-loaded, thermocoupled filter is next mounted in a filter exhaust line enclosure or can of conventional design, and the inlet cone for the can is connected to a conduit leading from a synthetic exhaust gas generator through exhaust stream heater to the cone. To prepare for each test run, the exhaust stream generator is then started with 100% nitrogen at a pre-selected exhaust flow rate, and the heater is activated to preheat the nitrogen exhaust stream and soot-loaded filter to a pre-selected exhaust temperature. Filter pre-heating is continued for about 30 minutes, and then the oxygen level of the exhaust stream is increased to a predetermined level by mixing air with the nitrogen. At the filter preheating temperatures of this Example, the added oxygen is sufficient to automatically initiate soot combustion within the filter, with rapid heating of the filter from the resulting exotherm.

Over the entire course of this regeneration run the thermocouple within the filter outputs data reflecting the temperature of the filter segment containing the thermocouple. These data enable the rate of temperature rise and the peak temperature reached by that filter segment during the exothermic soot combustion reaction to be determined. Following completion of the run, the filter is removed from the can and weighed to determine the quantity of residual soot, if any, remaining in the filter following the regeneration.

For the series of test runs reported in this Example, multiple levels of initial soot loading S, exhaust inlet temperature $T_i$, exhaust inlet oxygen level $O_2$, and inlet exhaust flow rate $V_i$ are used. Representative test values for these variables are as follows:

S—9 g/l, 15 g/l, 22 g/l $T_i$—550° C., 600° C., 650° C.

$O_2$—2%, 6.5%, 11%, 15.5%, 20%

$V_i$—700 l/min, 1525 l/min, 2350 l/min, 3175 l.min and 4000 l/min

Examples of specific test run conditions included in the above-described test of this filter are reported below in Table 1. Of course, not all combinations of the above variables need to be tested, since statistical methods for establishing correlations among these variables and between these variables and the peak filter regeneration temperature or residual soot loading are well known and widely available.

TABLE 1

Exhaust Filter Test Run Conditions

| Run Number | Exhaust Inlet Temp (° C.) | Exhaust Inlet $O_2$ % | Exhaust Inlet Flow Rate (L/min) | Initial Soot Loading (g/L) |
|---|---|---|---|---|
| 1A | 650 | 15.5 | 700 | 9 |
| 2A | 650 | 11 | 1525 | 22 |
| 3A | 650 | 15.5 | 2350 | 15 |
| 4A | 650 | 6.5 | 1525 | 15 |
| 5A | 550 | 2 | 3175 | 22 |
| 6A | 600 | 20 | 700 | 15 |
| 7A | 650 | 15.5 | 2350 | 15 |
| 8A | 600 | 11 | 2350 | 9 |
| 9A | 550 | 15.5 | 4000 | 9 |
| 10A | 650 | 15.5 | 2350 | 15 |
| 11A | 550 | 15.5 | 1525 | 15 |
| 12A | 600 | 2 | 4000 | 15 |
| 13A | 600 | 15.5 | 700 | 22 |
| 14A | 650 | 15.5 | 2350 | 15 |
| 15A | 650 | 6.5 | 2350 | 22 |
| 16A | 550 | 6.5 | 3175 | 15 |
| 17A | 550 | 20 | 1525 | 22 |
| 18A | 600 | 6.5 | 4000 | 22 |
| 19A | 650 | 15.5 | 2350 | 15 |
| 20A | 650 | 15.5 | 700 | 22 |
| 21A | 650 | 20 | 700 | 22 |
| 22A | 650 | 15.5 | 700 | 22 |
| 23A | 550 | 15.5 | 700 | 9 |
| 24A | 600 | 15.5 | 700 | 9 |
| 25A | 600 | 15.5 | 4000 | 9 |
| 26A | 650 | 15.5 | 3600 | 9 |
| 27A | 650 | 12 | 1525 | 15 |
| 28A | 600 | 8 | 3175 | 15 |
| 29A | 650 | 15.5 | 3600 | 22 |
| 30A | 650 | 20 | 2350 | 9 |
| 31A | 600 | 10 | 2350 | 22 |

The results of test runs such as shown in Table 1 above may be graphically plotted to illustrate correlations between filter response and selected regeneration condition variables that may be of particular interest. Such plots are helpful, for example, to test correlation trends against chemical and physical understandings or expectations regarding specific response trends.

Figure 3:
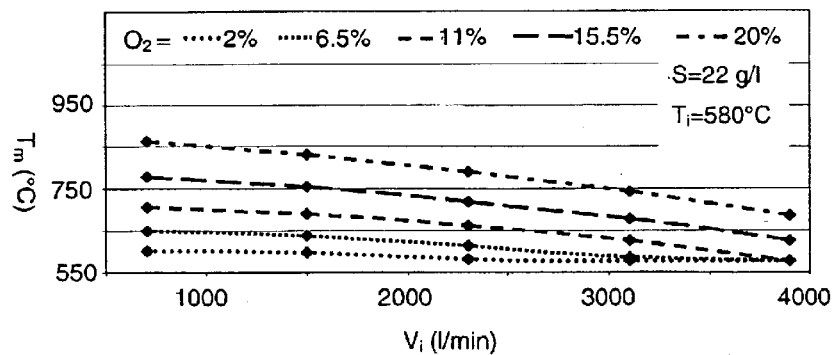
FIG. 3 plots peak regeneration temperature $T_m$ against exhaust gas flow rate over a range of exhaust oxygen levels at a first exhaust gas inlet temperature $T_i$.
Figure 4:
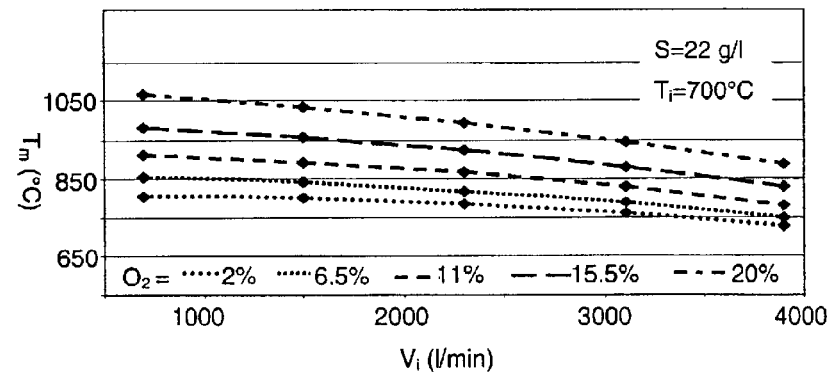
FIG. 4 plots peak regeneration temperature $T_m$ against exhaust gas flow rate over a range of exhaust oxygen levels at a second exhaust gas inlet temperature $T_i$.

FIGS. 3 and 4 of the drawings are representative of such graphical plots. FIG. 3 plots filter peak regeneration temperature $T_m$ as a function of exhaust inlet flow rate $V_i$ for a first set of exhaust oxygen levels $O_2$ at a fixed initial soot loading level S and a first fixed exhaust inlet temperature $T_i$. FIG. 4 plots the same correlation between $T_m$ and $V_i$ for the same soot loading and set of oxygen levels, but for a different value of exhaust inlet temperature $T_i$.

While these graphs are illustrative, it will be apparent that the number of graphs required to fully map filter response for all such variables and their interactions would be impractical, and that the resulting graph collection would not provide a convenient design tool. Accordingly it is preferred to use test data resulting from a series of test runs such as reported in Table 1 to construct a multivariate response surface or model that provides a complete map of filter response under any selected set of regeneration conditions.

Methods for empirically developing such models are well known, typically involving statistical analyses of data generated as above described and a review of the resulting R2 values for maximum model fit to the data. The models can be simplified by focusing on numbers above 90% and then readjusting the R2 values, to minimize or at least reduce the number of model terms required. A suitable form of equation for the model can then be selected and coefficients for the variables established.

Table 2 below provides an example of the development of such a model, in this case a model to correlate a selected set of regeneration condition input variables with the filter peak regeneration temperature output variable. Included in Table 2 are a listing of the regeneration variables analyzed, coefficients for each of the variables, and calculated values for the variance and percent of collective variance on the model output.

Figure 5:
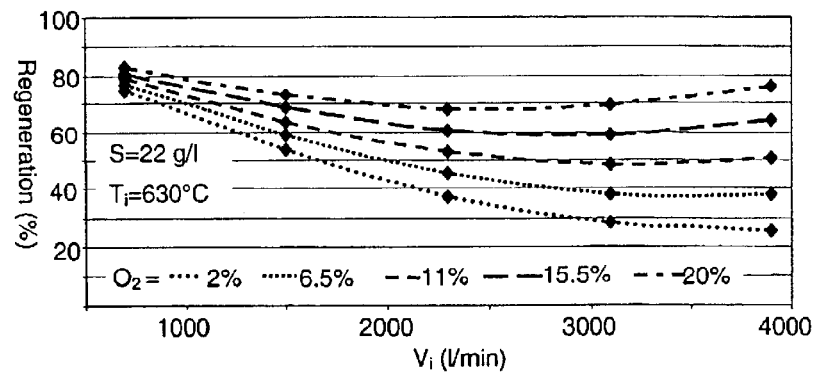
FIG. 5. plots filter regeneration efficiency against exhaust gas flow rate over a range of exhaust oxygen levels at a selected exhaust gas inlet temperature $T_i$.

Similar evaluations are used to develop a response model that maps filter regeneration efficiency or the proportion of originally loaded but unburned particulate present in a filter after a regeneration cycle. FIG. 5 of the drawing plots one data set for this variable, termed % Regeneration, for a representative series of regeneration runs over a range of synthetic exhaust flow rates $V_i$ and exhaust oxygen levels $O_2$ at a set inlet temperature and initial particulate loading.

TABLE 2

Maximum Filter Temperature Model Analysis

| Variable Name | Symbol | Coefficient | Variance | % Total Variance | |
|---|---|---|---|---|---|
| | Intercept | −2959.499602 | | | |
| Exhaust Inlet temp (° C.) | $T_i$ | 9.865047 | 374490 | 35.54 | |
| Inlet Oxygen Level (%) | $O_2$ | 0 | | | |
| Inlet Flow Rate (l/min) | $V_i$ | 0.0805099 | 9765 | 0.93 | |
| Initial Soot Loading (g/l) | S | −21.183924 | 2752 | 0.26 | |
| | R | 12.2462616 | 15174 | 1.44 | |
| squared terms | $T_i^2$ | −0.0071642 | 5141 | 0.49 | |
| | $O_2^2$ | 0.317079 | 5786 | 0.55 | |
| | $V_i^2$ | −0.000007 | 3649 | 0.35 | |
| | $S^2$ | 0 | | | |
| | $R^2$ | −0.0917455 | 13607 | 1.29 | |
| Interactions | $T_i*O_2$ | 0 | | | |
| | $T_i*V_i$ | 0 | | | |
| | $T_i*S$ | 0.051518 | 3477 | 0.33 | |
| | $T_i*R$ | −0.0126397 | 3683 | 0.35 | |
| | $O_2*V_i$ | −0.0017382 | 18077 | 1.72 | |
| | $O_2*S$ | 0.3913894 | 517035 | 49.07 | |
| | $O_2*R$ | 0 | | | |
| | $V_i*S$ | −0.0032657 | 12235 | 1.16 | |
| | $V_i*R$ | 0.0002619 | 2259 | 0.21 | |
| | $S*R$ | 0 | | | |
| | Total | | 1053587 | 93.69 | $R^2$ |
| | | | | 92.7 | Adjusted $R^2$ |

As the analysis in Table 2 suggests, exhaust inlet temperature Ti and the interactive variable $T_i*O_2$ are strong contributors to the peak regeneration temperature in this model.

Analysis of a larger set of % Regeneration data collected at different particulate loading levels S and synthetic exhaust gas inlet temperatures $T_i$ using this procedure yields the statistical results shown in Table 3 below.

TABLE 3

Percent Filter Regeneration Model Analysis

| Variable Name | Symbol | Coefficient | Variance | % Total Variance | |
|---|---|---|---|---|---|
| | Intercept | −11.46717 | | | % Regen |
| Exhaust Inlet temp (° C.) | $T_i$ | 0.031271869 | 2.3491 | 68.10 | |
| Inlet Oxygen Level (%) | $O_2$ | 0 | | 0.00 | |
| Inlet Flow Rate (l/min) | $V_i$ | 0.000215943 | 0.00763 | 0.22 | |
| Initial Soot Loading (g/l) | S | 0.027120912 | 0.00215 | 0.06 | |
| Squared terms | $T_i^2$ | −1.8023E−05 | 0.01213 | 0.35 | |
| | $O_2^2$ | 0 | | 0.00 | |
| | $V_i^2$ | 0.00000005 | 0.12271 | 3.56 | |
| | $S^2$ | −0.00078845 | 0.00681 | 0.20 | |
| Interactions | $T_i*O_2$ | 0 | | 0.00 | |
| | $T_i*V_i$ | −9.88E−07 | 0.71815 | 20.82 | |
| | $T_i*S$ | 0 | | 0.00 | |
| | $O_2*V_i$ | 0.000007522 | 0.1795 | 5.20 | |
| | $O_2*S$ | 0 | | 0.00 | |
| | $V_i*S$ | 0 | | 0.00 | |
| | | | 3.44955 | 98.51 | $R^2$ |
| | | | | 98.1 | Adjusted $R^2$ |

As a study of this analysis suggests, the strongest contributors to regeneration efficiency results are exhaust gas inlet temperature and the exhaust inlet temperature/inlet flow rate interaction.

An obvious use for models produced as above described is the derivation of multivariate limits on filter operating conditions that will promote complete regeneration yet insure extended filter service life. These models can project interactive limits on filter regeneration condition variables such as $O_2$, $V_i$, $T_i$, $HC_i$ and/or S to maintain filter regeneration temperatures and gradients at optimal levels but below specified limits. Material properties such as physical softening or melting points maximum permissible thermal gradients will vary as different filter compositions and/or geometries are selected for use in filter design; these can superimpose operating limits on the values of the input variables. Knowledge of such limits can be of substantial value for designing filters or selecting particular filter designs for particular applications.

Figure 6:
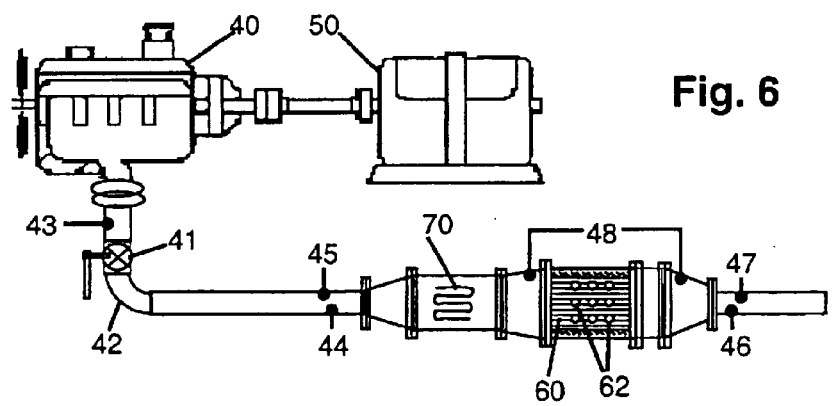
FIG. 6 illustrates diesel engine apparatus for mapping filter response variables.

Although bench testing provides significant advantages for determining filter response characteristics over the widest possible ranges of regeneration conditions, engine testing is also important both for further filter evaluations and for validating bench testing responses under actual engine operating conditions. An example of an engine testing facility suitable for conducting such engine tests is schematically illustrated in FIG. 6 of the drawings. Referring more particularly to FIG. 6, engine 40 is a light-duty North American diesel engine outfitted with a dynamometer 50 for applying load to the engine and an exhaust filter 60 for the filtration of the engine exhaust gas. A rectifier-controlled electric heater 70 is mounted on engine exhaust line 42 for adding heat to the exhaust to initiate filter regeneration during testing. An exhaust brake 41 is provided on the exhaust line near the engine for the purpose of enabling engine operation under constant backpressure. This mode of engine operation is helpful for insuring constant soot characteristics over the interval during which soot is accumulating in the filter.

Sensors are provided in the exhaust line to measure total exhaust system backpressure (43), exhaust gas temperature (44) and pressure (45) upstream of the heater and filter, exhaust gas temperature (46) and pressure (47) downstream of the heater and filter, and pressure drop across the filter (48). Further, a sensor array 62 is provided within the filter to measure temperatures and temperature gradients across the array within the filter in response to various engine operating and filter regeneration conditions.

In the operation of an engine filter test system such as described, loading of the filter 60 with a measured quantity of soot is accomplished by running the engine for a period of time under a preselected load and at a preselected engine speed and fuel delivery rate until the required quantities of soot have been generated. The filter can be periodically removed from the exhaust line to check progress and soot properties. Engine conditions can be controlled to generate either "dry" soot or "wet" soot, these being defined, respectively, as containing less than 10% or more than about 65% by weight of residual unburned volatile organics. Evaluations of filter regeneration performance for each of these two different soot types may sometimes useful for filter design or operation.

Once the filter to be tested has been loaded with the required soot compliment, the engine is set and the exhaust system stabilized at a particular engine speed and torque. After a two-minute stabilization period, exhaust heater 70 is activated to raise the inlet exhaust gas temperature to 650° C. at the filter inlet, thus initiating soot combustion and a regeneration cycle. A controlled heating rate of about 5° C./sec to this set temperature is used. Exhaust temperature and other engine operating conditions including engine speed and torque are thereafter maintained constant throughout the combustion/regeneration cycle. During that cycle, filter temperatures, exhaust system pressures and temperatures, exhaust inlet oxygen levels, engine fuel consumption and all other engine control feedback parameters are continuously monitored and recorded. At the conclusion of the cycle the filter is removed and weighed to record residual soot content, if any. Following weighing, the filter is heated to 650° C. in air to insure complete removal of any residual soot prior to the next testing cycle.

Table 4 below sets out a statistically designed testing regime that is suitable for evaluating filter regeneration response for a commercially available diesel filter design over a reasonably broad range of engine operating conditions. The filter design evaluated, corresponding to the EX-80 particulate filter design of Corning Incorporated, is a wall-flow honeycomb filter of cordierite composition, having a wall porosity of about 45%, a cell wall thickness of about 0.017 inches, and a cell density of about 100 cells or channels per square inch of honeycomb cross-section.

The test regime shown in Table 4 enables complete mapping of filter regeneration response for both wet and dry soots at soot loadings of 3–9 grams/liter of filter volume, engine speeds of 800–2200 rpm, and engine torque values in the range of 0–611 Nm.

TABLE 4

Experimental Test Matrix for EX80 Filter Map

| Test Sequence | Soot type | Soot Loading [g/L] | Engine Speed (rpm) | Engine Torque [Nm] |
| --- | --- | --- | --- | --- |
| 1 | dry | 6 | 800 | 0 |
| 2 | dry | 6 | 1900 | 0 |
| 3 | dry | 6 | 1100 | 436 |
| 4 | dry | 6 | 2200 | 567 |
| 5 | dry | 9 | 2200 | 0 |
| 6 | dry | 9 | 800 | 374 |
| 7 | dry | 9 | 1900 | 611 |
| 8 | dry | 6 | 1100 | 436 |
| 9 | dry | 3 | 1500 | 0 |
| 10 | wet | 3 | 800 | 187 |
| 11 | wet | 9 | 1500 | 302 |
| 12* | wet | 6 | 2200 | 0 |
| 13 | dry | 6 | 1100 | 436 |
| 14 | wet | 6 | 800 | 374 |
| 15 | wet | 6 | 1500 | 603 |
| 16 | wet | 9 | 800 | 0 |
| 17* | wet | 9 | 2200 | 0 |
| 18 | wet | 9 | 1100 | 436 |
| 19 | dry | 6 | 1100 | 436 |

Engine testing regimes differing from that reported in Table 4 may of course be adopted for different filter compositions, geometries and porosities, just as test sequences optimized for validating filter maps and responses for filters to be used in light and heavy duty diesel engine exhaust systems may differ significantly from those for lighter filters to be used in passenger car exhaust systems. In all cases however, these engine tests are helpful not only to validate filter responses under use conditions but also to further adapt and refine bench testing systems and procedures as valuable tools for the development of more advanced filter designs.

Of course the specific descriptions and examples presented herein are intended to be illustrative rather than limiting, it being evident from the foregoing disclosure that various modifications and adaptations thereof may be resorted in the practice of the invention within the scope of the appended claims.

We claim:

1. A method for determining the regeneration performance of an engine exhaust gas particulate filter under multiple sets of filter regeneration conditions which comprises the steps of:
    (a) loading the filter with a measured quantity of combustible particulate material;
    (b) conveying through the filter a gas stream characterized by two or more exhaust gas inlet variables selected from the group consisting of inlet oxygen content $O_2$, inlet temperature $T_i$, inlet flow rate $V_i$, and inlet hydrocarbon content $HC_i$, at least two of the exhaust variables being known;
    (c) initiating combustion of the particulate material while maintaining the at least two exhaust inlet variables constant;
    (d) determining at least one of a peak combustion temperature and a residual particulate material content for the filter resulting from the combustion; and
    (e) repeating steps (a)–(d) at different values for at least one of the two exhaust inlet variables.

2. A method in accordance with claim 1 wherein the combustible particulate material is a synthetic carbon powder and the gas stream is a synthesized nitrogen-air mixture.

3. A method for modeling the regeneration performance of a filter design of known honeycomb geometry and composition type which comprises the steps of:
    (a) loading a sample filter of the known honeycomb geometry and composition type with a measured quantity S of combustible particulate material;
    (b) conveying through the filter an exhaust gas stream characterized by two or more exhaust inlet variables selected from the group consisting of inlet oxygen content $O_2$, inlet temperature $T_i$, inlet flow rate $V_i$, and inlet hydrocarbon content $HC_i$, at least two of the exhaust variables being known;
    (c) initiating combustion of the combustible particulate material while maintaining the at least two exhaust inlet variables constant;
    (d) determining the value of a filter response variable R selected from the group of: a filter peak combustion temperature and filter regeneration efficiency for the filter resulting from the combustion;
    (e) repeating steps (a)–(d) to generate a data set correlating values of the selected filter response variable R with different values of S and each of the at least two inlet variables, and
    (f) extending and/or extrapolating the data in the data set to generate a response surface correlating the at least one response variable R with different values of S and the at least two exhaust inlet variables, such that additional values of the response variable R can be calculated from the response surface.

4. A method in accordance with claim 3 wherein the filter response variable R is selected from the group consisting of filter peak combustion temperature and filter regeneration efficiency, and wherein the exhaust gas stream variables are selected from the group consisting of exhaust gas inlet oxygen content $O_2$, inlet temperature $T_i$, inlet flow rate $V_i$, and inlet hydrocarbon content $HC_i$.

5. A numerical model of the form $R=f(V1, V2, \ldots, Vn)$ correlating a filter regeneration response value R for an engine exhaust particulate filter of known material type and geometry with a function f of a set of terms (V1, V2, ... Vn), wherein R is a filter response value selected from the group of: peak filter regeneration temperature and filter regeneration efficiency, the set of terms (V1, V2, ... Vn) includes terms dependent on the values of at least two regeneration condition variables selected from the group consisting of inlet oxygen content $O_2$, inlet temperature $T_i$, inlet flow rate $V_i$, inlet hydrocarbon content $HC_i$, and initial combustible particulate loading S, and the function f is an empirical function correlating values of R with values of the regeneration condition variables.

6. A numerical model in accordance with claim 5, wherein the function f is a polynomial function of 6–10 terms including first order, second order or interactive terms dependent on the value of the regeneration condition variables.

7. A method for aiding a customer in the design of a diesel exhaust emissions control system, comprising:
    (a) selecting a diesel particulate filter of predetermined geometry and composition type based on customer requirements;
    (b) generating a numerical model of filter regeneration response characteristics for the selected filter, the numerical model correlating a regeneration response R with a set of terms (V1, V2, ... Vn) that includes terms dependent on at least two different filter regeneration conditions;
    (c) storing the numerical model in digital form on a digital information storage medium; and
    (d) providing the numerical model in combination with the selected diesel particulate filter to the customer.

8. A method in accordance with claim 7 wherein the numerical model is of the form $R=f(V1, V2, \ldots, Vn)$, wherein R is a filter response value selected from the group of: peak filter regeneration temperature and filter regeneration efficiency, the set of terms (V1, V2, ... Vn) includes terms dependent on the values of at least two regeneration condition variables selected from the group consisting of inlet oxygen content $O_2$, inlet temperature $T_i$, inlet flow rate $V_i$, inlet hydrocarbon content $HC_i$, and initial combustible particulate loading S, and the function f is an empirical function correlating values of R with values of the regeneration condition variables.

9. A method in accordance with claim 8 wherein the numerical model includes indicators of limits on the values of the regeneration condition variables, said limits when observed being effective to limit the correlating filter response value R to a value compatible with a material composition and geometric design for the selected diesel particulate filter.

* * * * *